United States Patent
Jørgensen (10) Patent No.: US 12,241,816 B2
(45) Date of Patent: Mar. 4, 2025

(54) DEVICE FOR AUTOMATED AND CONTAMINATION-FREE SAMPLING AND ANALYSING

(71) Applicant: ATLINE APS, Kolding (DK)

(72) Inventor: Thomas Kniep Jørgensen, Kolding (DK)

(73) Assignee: Atline Aps, Kolding (DK)

( * ) Notice: Subject to any disclaimer, the term of this patent is extended or adjusted under 35 U.S.C. 154(b) by 703 days.

(21) Appl. No.: 17/291,182

(22) PCT Filed: Nov. 5, 2019

(86) PCT No.: PCT/DK2019/050335
§ 371 (c)(1),
(2) Date: May 4, 2021

(87) PCT Pub. No.: WO2020/094199
PCT Pub. Date: May 14, 2020

(65) Prior Publication Data
US 2022/0074826 A1 Mar. 10, 2022

(30) Foreign Application Priority Data

Nov. 7, 2018 (DK) ................................ 201870734

(51) Int. Cl.
*G01N 1/28* (2006.01)
*B02C 18/22* (2006.01)
(Continued)

(52) U.S. Cl.
CPC ......... *G01N 1/286* (2013.01); *B02C 18/2216* (2013.01); *G01N 21/01* (2013.01);
(Continued)

(58) Field of Classification Search
CPC .... G01N 1/286; G01N 21/01; G01N 35/0099; G01N 35/04; G01N 35/1009;
(Continued)

(56) References Cited

U.S. PATENT DOCUMENTS 5,580,007 A 12/1996 Caviezel et al.
5,605,841 A * 2/1997 Johnsen ............ G01N 21/3563
422/62

(Continued)

FOREIGN PATENT DOCUMENTS

CN 1764522 A 4/2006
CN 101108321 A 1/2008
(Continued)

OTHER PUBLICATIONS

Office Action and English translation for corresponding JP Application No. 2021-525074, dated Aug. 18, 2023, 15 pages.
(Continued)

*Primary Examiner* — Tarifur R Chowdhury
*Assistant Examiner* — Joshua M Carlson
(74) *Attorney, Agent, or Firm* — Crowell & Moring LLP; John C. Freeman (57) ABSTRACT

A device is disclosed for handling a sample container (13) having an open side, the device comprising a head (1) having an inner chamber (3) with an opening (4) and a substantially constant cross-sectional shape taken perpendicularly to a longitudinal axis of the inner chamber, wherein the opening extends substantially perpendicularly to said longitudinal axis, a rotor (6) part arranged within said inner chamber, rotor drive means (7) and rotor displacement means (8), a piston (5) having an edge part (9) of a cross-sectional shape corresponding to the cross-sectional shape of the inner chamber, and piston displacement means (8) arranged to displace the rotor along the longitudinal axis
(Continued)

so that the edge part of the piston will scrape the wall (10) of the inner chamber, the device further comprising a holder (11) arranged for supporting a sample container so that the open side of the sample container is in connection with the opening of the inner chamber, and head drive means (2) arranged for alternating the orientation of the head between a position where the opening of the inner chamber is oriented upwards and a position, where the opening of the inner chamber is oriented downwards.

24 Claims, 6 Drawing Sheets (51) Int. Cl.
G01N 21/01 (2006.01)
G01N 35/00 (2006.01)
G01N 35/04 (2006.01)
G01N 35/10 (2006.01)

(52) U.S. Cl.
CPC ......... *G01N 35/0099* (2013.01); *G01N 35/04* (2013.01); *G01N 35/1009* (2013.01); *G01N 2001/2866* (2013.01); *G01N 2035/0441* (2013.01)

(58) Field of Classification Search
CPC .... G01N 2001/2866; G01N 2035/0441; B02C 18/2216
See application file for complete search history.

(56) References Cited

U.S. PATENT DOCUMENTS

| | | | | |
|---|---|---|---|---|
| 6,739,207 | B2* | 5/2004 | Sjoquist | G01N 21/3563 73/864.81 |
| 7,291,001 | B2 | 11/2007 | Bacher et al. | |
| 7,980,500 | B2 | 7/2011 | Jenni et al. | |
| 9,149,810 | B2 | 10/2015 | Jagle et al. | |
| 2004/0000202 | A1 | 1/2004 | Sjoquist | |
| 2005/0037485 | A1* | 2/2005 | Rodgers | G01N 35/0099 506/43 |
| 2006/0006262 | A1 | 1/2006 | Gilberts | |
| 2006/0093696 | A1 | 5/2006 | Bacher et al. | |
| 2008/0203201 | A1 | 8/2008 | Deppermann | |
| 2008/0208234 | A1 | 8/2008 | Jenni et al. | |
| 2010/0263551 | A1 | 10/2010 | Pavero | |
| 2011/0104742 | A1* | 5/2011 | Fox | G01N 1/30 435/309.1 |
| 2012/0228415 | A1 | 9/2012 | Jagle et al. | |
| 2015/0253195 | A1* | 9/2015 | Pereverzev | G01J 5/061 250/339.03 |
| 2016/0029844 | A1 | 2/2016 | Pineda et al. | |
| 2016/0296073 | A1* | 10/2016 | Pineda | B01F 33/35 |

FOREIGN PATENT DOCUMENTS

| | | |
|---|---|---|
| CN | 101247891 A | 8/2008 |
| CN | 102342469 A | 2/2012 |
| CN | 102596417 A | 7/2012 |
| CN | 202365649 U | 8/2012 |
| CN | 204051496 U | 12/2014 |
| CN | 204455595 U | 7/2015 |
| CN | 204485759 U | 7/2015 |
| CN | 204769430 U | 11/2015 |
| CN | 106108662 A | 11/2016 |
| CN | 108354434 A | 8/2018 |
| CN | 207680760 U | 8/2018 |
| EP | 2 227 123 A2 | 5/2009 |
| JP | H1-267423 | 10/1989 |
| JP | H7-008773 | 1/2022 |
| KR | 200211177 Y1 | 1/2001 |
| TW | 201422184 A | 6/2014 |
| WO | 2004/003525 A1 | 1/2004 |
| WO | 2015/147911 A1 | 10/2015 |

OTHER PUBLICATIONS

International Preliminary Report on Patentability for PCT/DK2019/050335, dated Dec. 10, 2020, 7 pp.
International Search Report and Written Opinion for PCT/DK2019/050335, dated Jul. 2, 2020, 17 pp.
Chinese Search Report and English translation for CN Application No. 2019800872152, dated Jan. 30, 2024, 9 pp.
Chinese Office Action and English translation for CN Application No. 2019800872152, dated Jan. 31, 2024, 23 pp.

* cited by examiner

DEVICE FOR AUTOMATED AND CONTAMINATION-FREE SAMPLING AND ANALYSING

The present invention relates to a device for automated handling of a sample container.

CROSS-REFERENCE TO RELATED APPLICATIONS

This application claims priority from PCT/DK2019/050335, filed Nov. 5, 2019, and thereby to Danish patent application PA201870734 filed Nov. 7, 2018, where the entirety of each is hereby fully incorporated by reference herein.

BACKGROUND OF THE INVENTION

Samples are taken from production of products, e.g. animal feed in pellet form, grain etc. and analysed for surveillance of the quality of the product. The sample may be taken directly from the product process line in order to perform an automatic analysis. Samples that are subjected to optical analysis, such as spectrographic analysis by e.g. Near Infrared Reflection (NIR) needs to be provided in a pulverized form in order to enhance analytical accuracy, for which reason a grinding of the sample often will be required.

US patent application US 2008/203201 A1 discloses an agricultural sample grinding system including a grinder unit for grinding and uniformly mixing an agricultural sample The system additionally includes a collection chamber connected to a transfer spout extending from a side of the grinder unit. The collection chamber is for collecting the ground and uniformly mixed agricultural sample dispensed from the grinder unit via the transfer spout. The system deposits the ground and uniformly mixed agricultural sample into the collection chamber such that the uniform mixture of the sample is maintained.

U.S. Pat. No. 5,580,007 discloses a device for cutting, pulverising and/or mixing of material in e.g. the laboratory area, where a blade rotates in a working chamber containing the material. The blade is during the processing of the material lowered into the working chamber together with a piston for gradually reducing the volume of the working chamber.

International patent application WO 2004/003525 discloses a device for grinding a selected sample and presenting the sample for an analysis system. The device comprises a grinding chamber with a grinding means for grinding the sample in the grinding chamber, and a pressing means for compression of the sample in the grinding chamber towards an analysis window for presentation of the sample for a NIR (Near Infrared Reflection) analysis system.

EP patent EP2 227 123 A2 discloses a device for cheese and products with similar consistency. The device comprise a sample chamber arranged with two non-overlapping sections, a mixing section adapted for mixing a content and a pressure section adapted for applying a pressure to the content. The mixing section having a larger diameter than the pressure section.

A stirring member is arranged in the mixing section for stirring and processing the ingredients into cheese. Subsequently processed ingredients are transferred to the pressure section where the sample is pressed into a compressed state using a pressure member.

BRIEF DESCRIPTION OF THE INVENTION

The present invention relates to a device having a head comprising an inner chamber with a rotor or rotor part, which preferably comprises a grinder or grinding means, and drive means or drive, such as a robotic arm, arranged for turning the head upside down, so the head in one position can receive the sample and process it with the rotor and in another position can empty the sample automatically from the inner chamber into a sample container with the assistance of a piston arranged in the inner chamber for scraping the sides thereof, which sample container may then be placed on an optical analysis system, in particular a standard optical analysis system for use in an ordinary laboratory. The device can also be arranged for automated washing of the sample containers as well as the inner chamber.

In an alternative use, the sample is in a condition that does not require processing by means of the rotor, such as grinding of the sample prior to analysis thereof by means of the optical analysis system. In the alternative use, the head of the device handles the sample container and performs automatic washing thereof and other functions that does not involve grinding of the sample.

Thus, the present invention relates to a device for handling a sample container having an open side, the device including
- a head having an inner chamber with an opening arranged at one end, the inner chamber having a substantially constant cross-sectional shape taken perpendicularly to a longitudinal axis of the inner chamber, wherein the opening extends substantially perpendicularly to said longitudinal axis, a rotor part arranged within said inner chamber,
- a rotor drive or rotor drive means arranged for rotating said rotor part around said longitudinal axis, a rotor displacer or rotor displacement means arranged to displace the rotor along the longitudinal axis,
- a piston having an edge part of a cross-sectional shape corresponding to the cross-sectional shape of the inner chamber, and
- a piston displacer or piston displacement means arranged to displace the piston along the longitudinal axis so that the edge part of the piston will scrape the wall of the inner chamber, the device further including
- holder arranged for supporting a sample container so that the open side of the sample container is in connection with the opening of the inner chamber, and
- a head drive or head drive means, such as a robotic arm, arranged for alternating the orientation of the head between a position where the opening of the inner chamber is oriented upwards and a position, where the opening of the inner chamber is oriented downwards.

By being able to alternate the orientation of the head, the inner chamber may be filled with a sample when oriented with the opening upwards, in which orientation the sample is processed by means of the rotor, so the sample particles, pellets or the like may move freely up and down to and from the rotor, whereby an even processing of the sample is promoted, and the inner chamber may be emptied again by alternating the orientation of the head so that the opening is oriented downwards and the processed sample will fall into the sample container helped by the scraping of the wall of the inner chamber by the edge part of the displaceable piston.

This device may be used to provide an automated and contamination-free sampling and analysing of matter taken from an ongoing production to observe the qualities of the produced matter The piston and the rotor may be displaced independently, but it is preferred for simplicity of the device that the two are arranged to be displaced simultaneously so that the piston displacement means also constitutes the rotor displacement means.

The rotor includes preferably a grinder or grinding means, such as one or more grinding edges, e.g., by means of one or more knives, so that the rotor when rotated by the rotor drive means is suitable for grinding a sample situated in the inner chamber.

The edge part of the piston is preferably made from an elastomer, such as natural rubber, synthetic rubber, silicon rubber or a mixture comprising one or more of said elastomers, but could alternatively be made e.g. from one or more steel rings that are elastically biased towards the wall of the inner chamber.

The device includes preferably a control or control means arranged to control the operation of at least the rotor drive or rotor drive means, the rotor displacer or displacement means, the piston displacer or piston displacement means and the head drive or head drive means so that a process conducted by means of the device can be at least partially automated and preferably fully automated.

The holder can be stationary so that an external gripper or a user can place a sample container in the holder. However, it is preferred that the holder is movable with respect to the head to retrieve a sample container containing a sample and placing it so that the open side of the sample container is in tight connection with the opening of the inner chamber and to remove the sample container from such position and place it at a second position, e.g. for analysis of the sample.

The holder is preferably arranged for supporting two sample containers simultaneously and move both sample containers simultaneously to exchange their mutual position with respect to the opening of the inner chamber. Hereby, the efficiency of the device can be improved, e.g. being able to remove one sample container from an analysis system after analysis thereof and replace it with another sample container while having the head in the same position. While the contents of the new sample container is analysed by the analysis system, the other sample container may be removed for cleansing and the head can be applied to process another sample The holder is preferably arranged on the head of the device and includes a holder driver or holder drive means for driving a movement of the holder. Hereby, the holder and the head are moved simultaneously.

The operation of the holder is also preferably controlled by means of the control means.

The device may further comprise a liquid disperser arranged for dispensing a cleansing liquid into a sample container held by the holder.

Likewise, the device may further comprise a dryer or drying means arranged for providing a drying airflow towards a sample container held by the holder.

The device may further comprise a suction device or suction means arranged for emptying of a sample container held by the holder, to remove the sample as well as any possible liquid applied to cleanse the sample container.

The device may further comprise a scanner arranged for scanning the upper surface of a sample situated in a sample container held by the holder. The scanner may be an optic scanner or alternatively an ultrasound scanner. The scanner is preferably arranged for detecting the height of the upper surface of the sample to determine whether the sample container is sufficiently filled with sample for the subsequent analysis.

The device comprises preferably an optical analysis system, in particular a near-infrared spectroscope, arranged for scanning the content of a sample container through a transparent bottom pan of the sample container, and wherein the holder is arranged to position a sample container for being scanned by the optical analysis system. The optical analysis system may alternatively be of the type where the upper surface of the sample is scanned through an open top of the sample container. However, the device may be operated together with such external optical analysis system without the optical analysis system actually being comprised within the device.

The control means of the device comprises in a particular embodiment of the present invention a data communication interface suitable for connection with a data communication interface of an optical analysis system, in particular a near-infrared spectroscope, such as an optical analysis system included into the device, and wherein the control means of the device is adapted for transferring data identifying the content of the sample container to a control means of the optical analysis system prior to scanning of the content of the sample container. Hereby, the device is adapted for operating with analysis of samples of a range of different matters, where the control means of the device by forwarding data identifying the matter contained in the sample container can control the whole operation and ensure that the output from the optical analysis system has been computed using the calibration data pertaining to the particular matter in the sample.

The control means of the device is preferably arranged to control the operation of the device in a sequence where the head is a position, where the opening of the inner chamber is oriented upwards, in which position the rotor drive means is operated to rotate the rotor for a period of time, followed by an alternation of the orientation of the head and the holder to a position, where the opening of the inner chamber is oriented downwards, where the rotor displacement means and the piston displacement means are operated to move the rotor and the piston to a position near the opening of the inner chamber, and the holder removing the sample container from its position in tight connection with the opening of the inner chamber. Hereby, the device is suitable for automatically processing a sample placed in the inner chamber by means of the rotor, followed by emptying the content of the inner chamber into a sample container by turning the head upside down and activating the piston to scrape the walls of the inner chamber.

Furthermore, the control or control means may be arranged to control the operation of the device in a sequence where the head initially is in a position, where the opening of the inner chamber is oriented downwards, and the holder is operated to place a sample container so that the open side of the sample container is in tight connection with the opening of the inner chamber, where after the head drive or head drive means is operated to alternate the orientation of the head and the holder to a position where the opening of the inner chamber is oriented upwards. Hereby, the inner chamber is filled with a sample from the sample container for subsequent processing thereof by means of the rotor as described previously.

The control means of the device may be arranged for determine the hardness of e.g. pellets of a sample, in which case the rotor comprises one or more blades each having a grinding edge and a blunt spine, and the control means is arranged to control the operation of the rotor to rotate in a first direction, where the grinding edge or edges are moved forward, followed by a reverse rotation, wherein the spine or spines are moved forward. By measuring the power consumption of the rotor drive means during the reverse rotation, the current state of the sample can be assessed, such as the general size of particles in the partly processed sample, whereby a measure of the hardness of the e.g. pellets can be determined.

The control means may further be arranged to clean a sample container, i.e. be arranged to control the operation of the device in a sequence where the head is a position, where the opening of the inner chamber is oriented downwards and a sample container is held by the holder in a position, where the open side of the sample container is accessible, where the head is moved to a position beneath the liquid dispenser, which is operated to dispense the cleansing liquid into the sample container, where after the holder is moved to place the open side of the sample container in tight connection with the opening of the inner chamber and the rotor and the piston is displaced by means of the rotor displacement means and the piston displacement means, so that the rotor extends into the sample container and the rotor is rotated by means of the rotor drive means, followed by moving the holder to remove the sample container from the tight connection with the opening of the inner chamber, emptying of the sample container and moving the head to a position with respect to the drying means, where the drying means is operated to provide a drying airflow into the sample container.

The sample container may be emptied by turning it upside down at a suitable location or by applying a suction means for removing the contents of the sample container.

The device comprises preferably a robotic arm to which the head is connected and which serves as head drive means, where the control means of the device preferably are controlling the robotic arm, either directly by means of an integrated control arrangement or by communicating with the control system of the robotic arm.

In a particularly preferred embodiment, the device comprises a carousel for holding a plurality of sample containers as well as carousel drive means for driving a rotation of the carousel and wherein the device is adapted for retrieving sample containers from the carousel by means of the holder, and wherein the operation of the carousel drive means is controlled by means of the control means of the device. Hereby, the device can be used for analysis of a plurality of different samples that are placed in the carousel by an automated arrangement or by an operator, and prepare the samples one by one for analysis. In this case, it is particularly advantageous that the control means of the device is provided with a data communication interface suitable for connection with a data communication interface of an optical analysis system, in particular a near-infrared spectroscope, as discussed previously, since the different samples often will be of different matters, which requires the use of individual calibration data for the optical analysis system.

Figure 10:
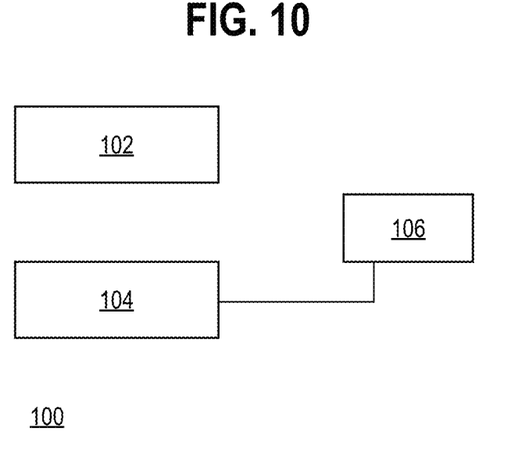
FIG. 10 schematically shows a system that includes the device of FIGS. 1-9 and an optical analysis system.

The present invention furthermore relates to a system 100 including a device 102 as disclosed herein and at least one arrangement for inline optical analysis, in particular a near-infrared spectroscope 104, of a flow of matter by means of an optical analysis system of the arrangement, wherein a control or control means 106 of the arrangement is adapted for receiving data from a scanning of matter from the optical analysis system of the device 102 and calibrate the optical analysis system of the arrangement based thereon. An inline optical analysis arrangement is suited for analysing the matter while it is being transported through, e.g., a pipe and is for that reason less reliable than the device as disclosed herein. Thus, by providing the inline optical analysis arrangement with data for the more reliable analysis of a sample from the same flow of matter, conducted by means of the device 102 as well as an optical analysis system, wherein the data are provided with a time stamp for when the sample was obtained from the flow a matter that is analysed by the inline arrangement, a calibration of the arrangement can be made when the data are compared with data obtained by the inline arrangement itself at approximately the same time. The above-described system 100 is schematically shown in FIG. 10, wherein components are denoted by rectangular boxes and are for illustrative purposes only in that the arrangement of boxes shown is not to be construed to limit the orientation or sizes of the components shown in FIG. 10.

The present invention further relates to the use of a device as disclosed herein for grinding of a sample and presenting the sample for an analysis system.

The use may include that said analysis system is an optical analysis system, in particular a near-infrared spectroscope.

The present invention further relates to a method for grinding of a sample and presenting the sample for an analysis system by means of a device as disclosed herein.

BRIEF DESCRIPTION OF THE DRAWING

An embodiment of the present invention is illustrated in the enclosed drawing of which

DETAILED DESCRIPTION OF AN
EMBODIMENT OF THE PRESENT INVENTION

Figure 1:
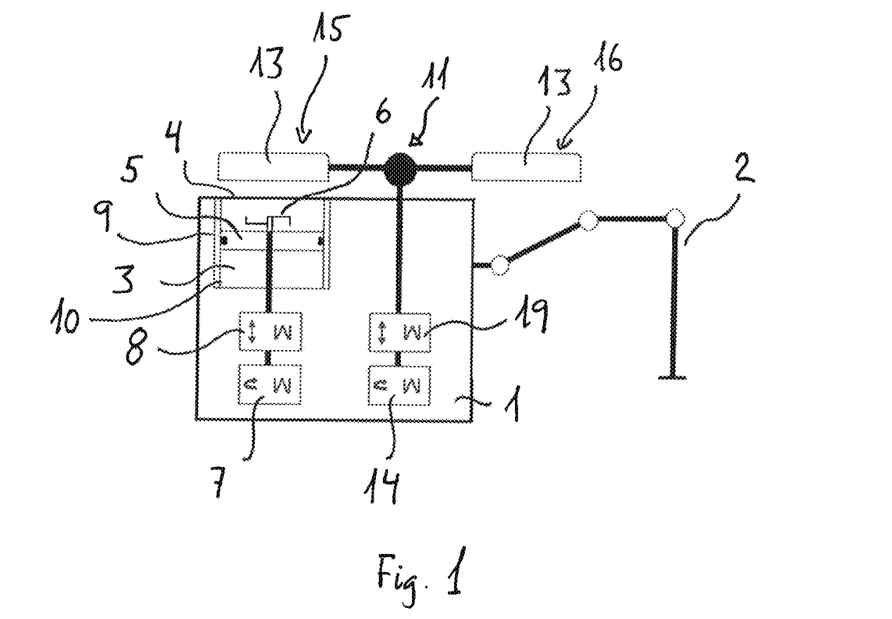
FIG. 1 shows the head of the device in a position where the opening of the inner chamber of the head is oriented upwards.
Figure 2:
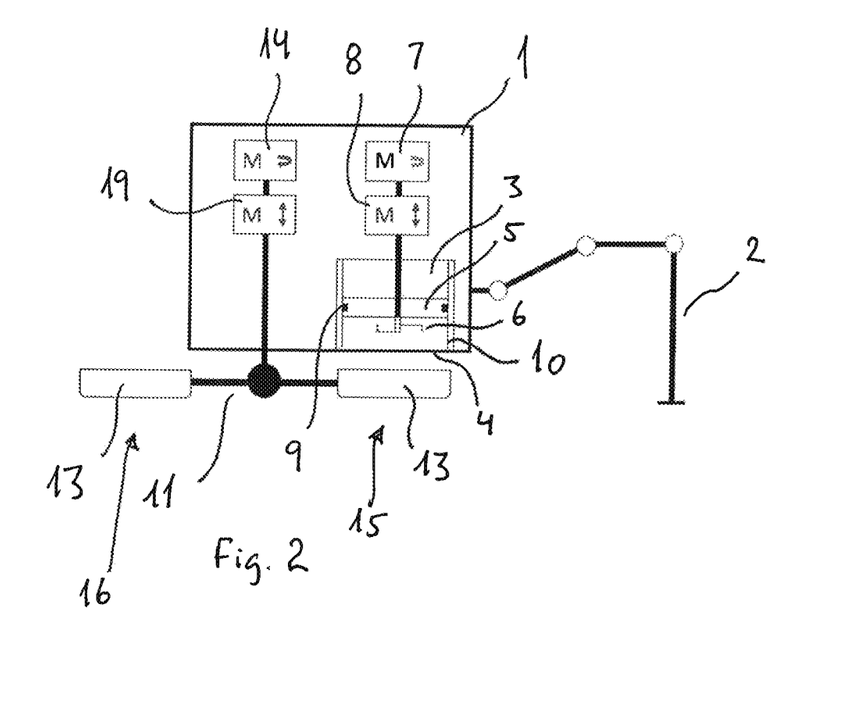
FIG. 2 shows the head of the device in a position where the opening of the inner chamber of the head is oriented downwards.

The device shown in the enclosed drawing comprises a head 1 arranged on an arm 2, which preferably is an robotic arm 2, the arm 2 having sufficient degrees of freedom to turn the orientation of the head upside-down and back as illustrated in FIGS. 1 and 2. The head 1 comprises an inner chamber 3 having an opening 4, which in FIG. 1 is oriented upwards and in FIG. 2 is oriented downwards. The inner cross-section of the chamber 3 is substantially circular and it contains a piston 5 and a rotor 6. The rotor may be driven by means of the rotor drive means 7, typically an electric motor, but could alternatively be e.g. a hydraulic motor or a pneumatic motor. The piston 5 and the rotor 6 can also be moved in the longitudinal direction of the inner chamber 3, i.e. up and down, by means of displacement means 8, which likewise typically is an electric linear actuator, but could alternatively be e.g. a hydraulic or a pneumatic linear actuator. The piston 5 comprises an edge part 9, such as an O-ring, made from an elastomer, preferably silicon rubber, so that it will scrape and clean the wall 10 of the inner chamber 3 when the piston 5 is moved back and forth inside the chamber 3.

The head 1 furthermore comprises a holder 11 with two gripping parts 12 (not shown) for holding two sample containers 13. The holder 11 comprises a first driving means 14 for rotating the holder 11 and the gripping parts 12 so that the position of the two sample containers 13 are switched from a first position 15, where a sample container 13 is aligned with the opening 4 of the inner chamber 3 and a second position 16, where the sample container 13 can be subjected to a scan, to cleaning, or to analysis, or the sample container 13 can be released from the gripping part 12 and placed e.g. on a scale 17 or and optical analysis system 18. The holder 11 also comprises holder displacement means 19 suitable for e.g. moving a sample container 13 in the first position 15 close to the opening 4 of the inner chamber 3 so as to create a tight connection between the two.

Figure 8:
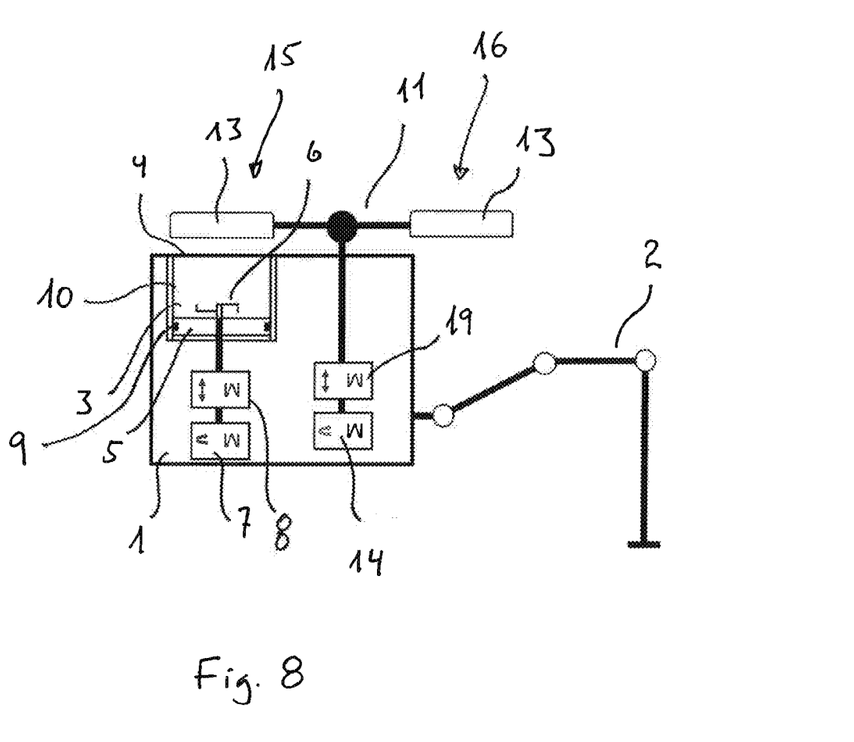
FIG. 8 shows the piston and the rotor in a retracted position away from the opening of the inner chamber.

In operation of the device, a sample may be achieved in two different manners. For both, the piston 5 and the rotor 6 are retracted to a position away from the opening 4 as shown in FIG. 8 to allow the sample to enter the inner chamber 3. In a first manner, the sample is extracted from e.g. a transport pipe for the matter to be sampled and tested by opening of a valve, from which the sample flows directly into the inner chamber 3 of the head 1. In this case, the head is positioned as shown in FIG. 1, wherein the opening 4 of the inner chamber 3 is oriented upwards. In the second manner, the sample flows from the valve or the like into a sample container 13 held by the holder 11 in the second position 16, where the head is positioned as shown in FIG. 2, where the opening 4 of the inner chamber 3 is oriented downwards and the sample container 13 is able to receive the sample. According to this second manner, the holder 11 is then rotated by means of the first driving means 14 so that the sample container 13 with the sample is positioned in the first position just in front of the opening 4 of the inner chamber 3, and the holder displacement means 19 is then activated to move the sample container into tight contact with the head 1. The head 1 is then rotated by means of the arm 2 to the position shown in FIG. 1, where the opening 4 of the inner chamber 3 is oriented upwards.

When the sample has been entered into the inner chamber 3 in either manner, the head 1 is now oriented as shown in FIG. 1 with the opening 4 of the inner chamber 3 oriented upwards and a sample container 13 held in the first position 15 by means of the holder 11 so that it is in tight connection with the head 1 and covers the opening 4.

The filling of the inner chamber 3 with the sample may optionally be determined in order to ensure that the amount of sample is sufficient for the testing. This can be done by rotating the rotor 6 slowly or tilt the head 1 repeatedly to distribute the sample more evenly and scan the surface of the sample inside the inner chamber 3 by means of e.g. an ultrasound sensor (not shown). Alternatively or additionally, the head 1 is turned by means of the arm 2 to empty the sample into the sample container 13 placed in the first position 15 and the sample container 13 with the sample is placed on a scale 17 by rotating the holder 11 to place the sample container in the second position 16, moving the head 1 with the holder 11 so that the sample container 13 is placed in the scale 17 and releasing the sample container 13 from the gripping part 12 (not shown) of the holder 11 so that the weight of the sample container 13 with the sample therein can be determined. In case both the scanning and the weighting are performed, an estimate of the density of the sample can be calculated. Hereafter, the sample is returned to the inner chamber 3 by engaging the sample container 13 on the scale 17 by means of the gripping part 12 of the holder 11, rotating the holder 11 so that the sample container 13 is in the first position 15, move the sample container 13 into tight contact with the head 1 by means of the holder displacement means 19 and rotating the head 1 to the position, where the opening 4 is oriented upwards, so that the sample falls into the inner cavity 3.

In case the hardness of particles of the sample, such as pellets or the like needs to be tested, the rotor 6 is rotated forwards for a predetermined period of time in order to partly disintegrate the pellets or particles. By the term forwards is understood that the rotor 6 comprises blades having a grinding edge, which is sharp, and an opposing blunt spine, where the grinding edge is moved forwards in a forward rotation of the rotor 6. Afterwards, the rotor 6 is rotated backwards at a predetermined rotational speed, and the resistance to the movement of the blunt spines from the partly disintegrated particles or pellets as measured e.g. by the power consumption of the rotor drive means 7 indicates the hardness of the particles or pellets.

Figure 9:
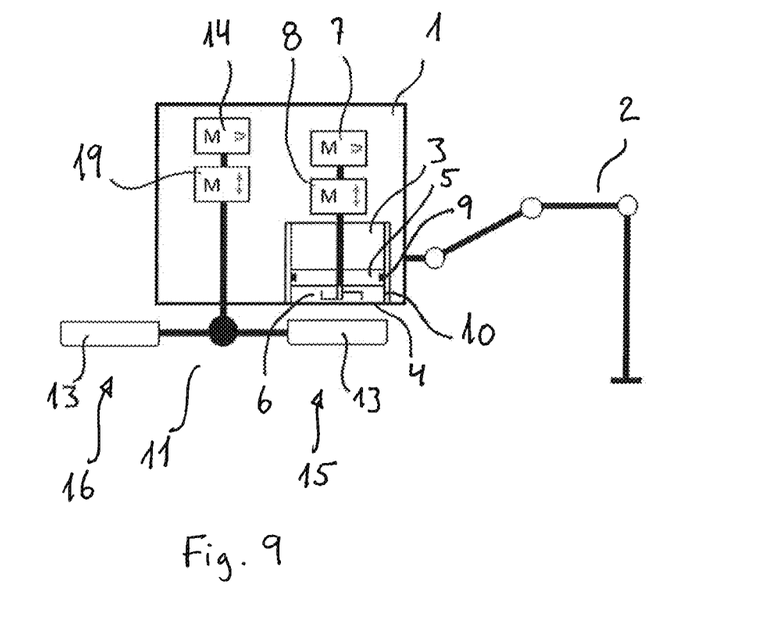
FIG. 9 shows the piston and the rotor in an extended position close to the opening of the inner chamber.

In order to grind the sample to a homogeneous powder, the rotor 6 is rotated forwards at a predetermined speed of rotation, and the power consumption of the rotor drive means 7 is monitored to determine when the power consumption becomes constant in time, which indicates that the sample is no longer disintegrated by the rotor 7. The head 1 is now turned by means of the arm 2 to a position, where the opening 4 of the inner chamber 3 is oriented downwards and the piston 5 and the rotor 6 is moved to an extended position close to the opening 4 as shown in FIG. 9, whereby the edge part 9 of the piston 5 scrapes the wall 10 of inner chamber 3 to ensure that the wall 10 is clean and all of the sample is transferred to the sample container 13 in the first position 15. In addition, the piston 5 hereby compacts the sample in the sample container 13. The rotor 6 is then rotated slowly in order to distribute the sample more evenly in the sample container 13.

Figure 3:
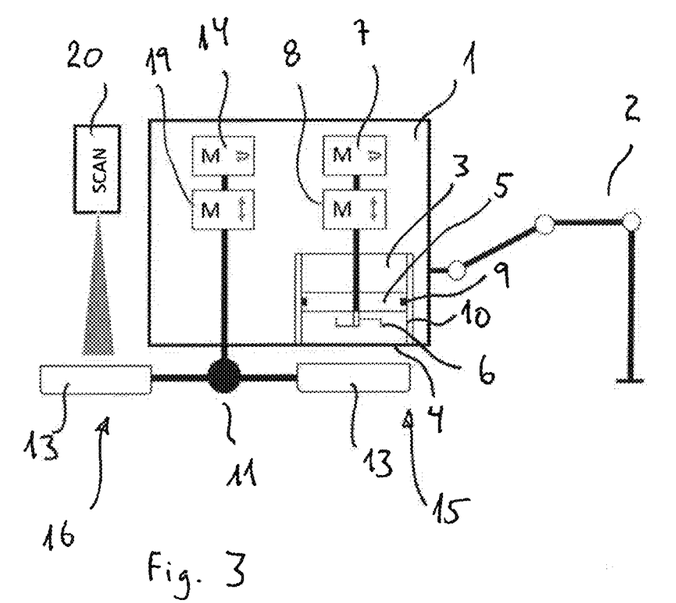
FIG. 3 shows the holder of the head positioning a sample container below a surface scanner for scanning the surface of the content of the sample container.

The sample container 13 holding the sample is now moved away from the tight contact with the head 1 by moving the holder 11 by means of the holder displacement means 19 and the holder 11 is rotated by means of the first driving means 14 so that the sample container is placed in the second position 16. The head 1 is moved by means of the arm 2 to a position, where the sample container is right below a surface scanner 20, e.g. an optical scanner or an ultrasound scanner, as shown in FIG. 3, which scans the surface of the sample in order to ensure a substantially even distribution of the sample, so that all of the transparent bottom of the sample container is covered by the sample for the later optical analysis to be performed correctly, and optionally to determine the volume of the sample.

Figure 4:
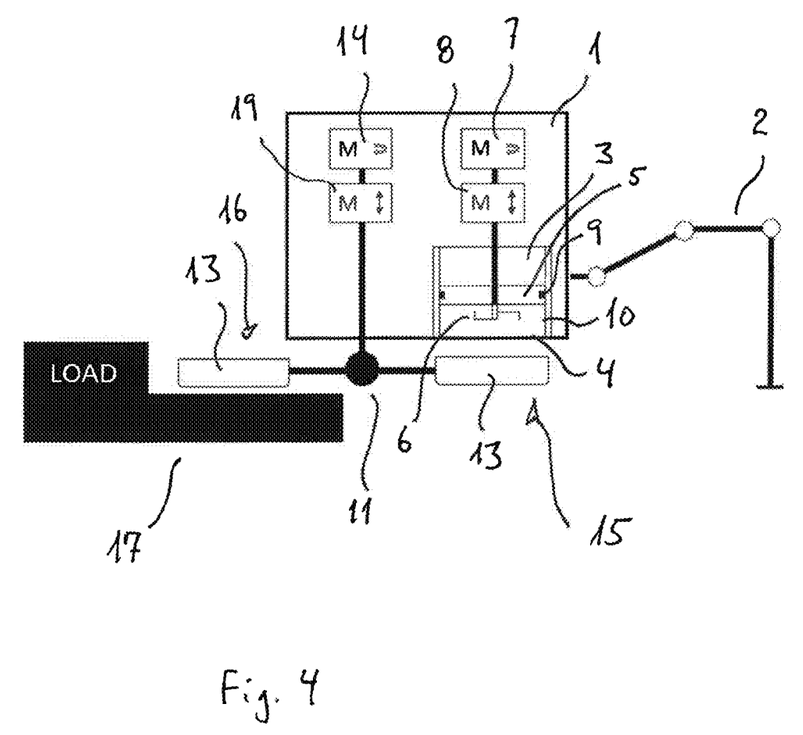
FIG. 4 shows the holder of the head positioning a sample container at a scale for determining the weight thereof.

Then, the sample container 13 may be transferred to the scale 17 as shown in FIG. 4 and discussed previously to determine the weight of the sample In case the sample also was weighted prior to the disintegration thereof, a weight loss due to evaporation of humidity from the sample may be determined. A precise density of the sample may be determined from weight and volume thereof.

Figure 5:
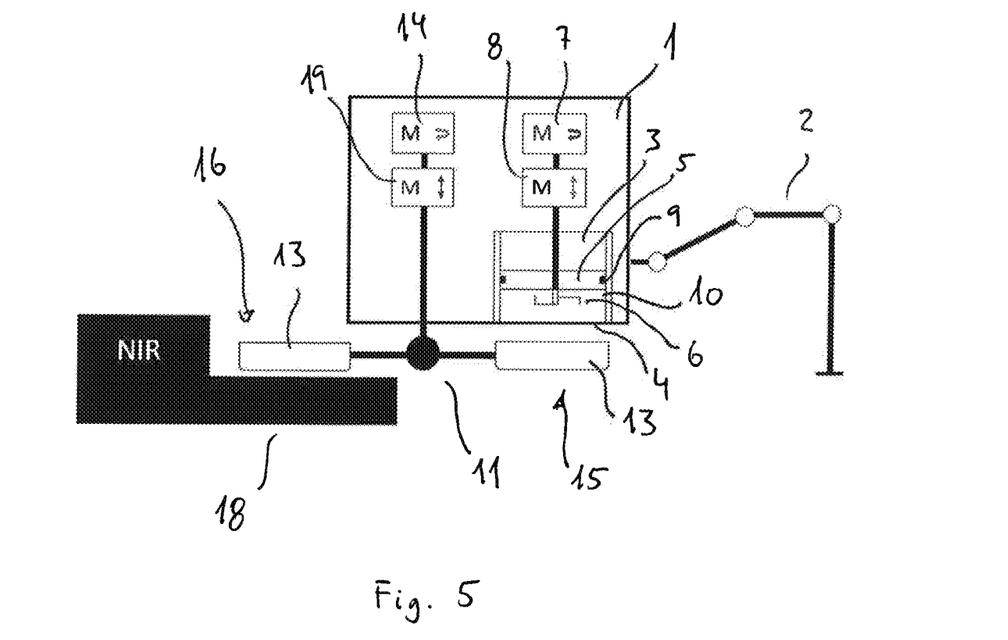
FIG. 5 shows the holder of the head positioning a sample container at a Near Infrared Reflection optical analysis system.

The sample container 13 is engaged again by the gripping part 12 of the holder 11, lifted from the scale 17 and placed, by moving the head 1 by means of the arm 2, on the optical analysis system 18 using Near Infrared (NIR) analysis as shown in FIG. 5. Prior to placing the sample container 13 on the optical analysis system 18, the free gripping part 12 of the holder 11 is moved to engage a previous sample container 13 already placed on the optical analysis system 18, remove it by rotating the holder 11 and situate the sample container 13 that has just been filled with a new sample on the optical analysis system 18 and releasing it from the gripping part 12 of the holder 11.

The optical analysis of the new sample in the sample container 13 placed on the optical analysis system 18 takes some time, during which the head 1 carrying the sample container 13 just removed from the optical analysis system 18 is moved to a disposal location (not shown) where the orientation of the head 1 is alternated so that the opening 4 of the inner chamber 3 is oriented downwards, whereby also the opening of the sample container 13 held by the gripping part 12 of the holder 11 is oriented downwards and the content of the sample container 13 is disposed of. In case the sample in the sample container 13 is sticky, e.g. due to high content of oil, an automated scraper (not shown) for scraping the inner of the sample container 13 may be arranged at the disposal location. The disposal location may alternatively comprise suction means for emptying of the sample container 13 without the need to turn the sample container 13 upside down. Suction means may also replace the possible scraper.

Figure 6:
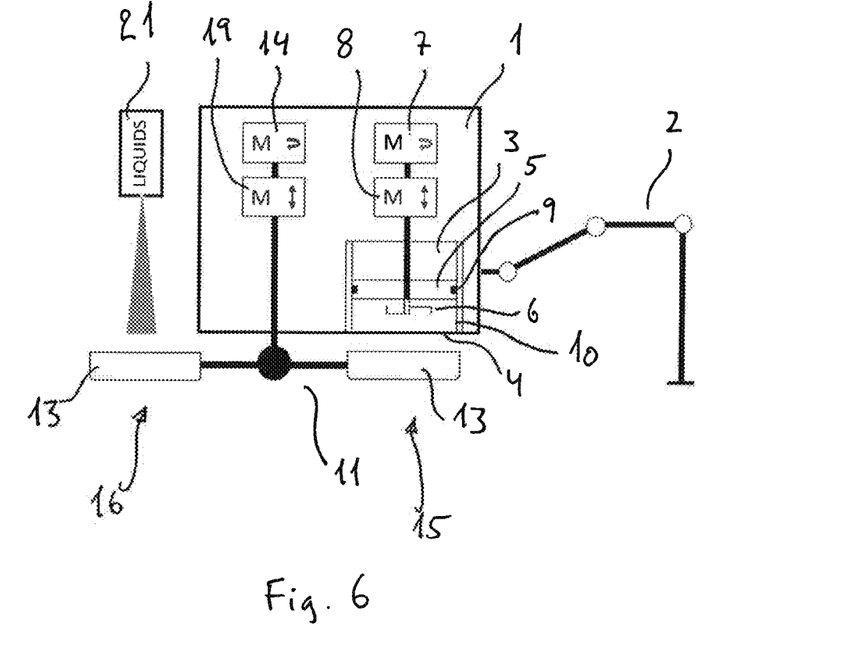
FIG. 6 shows the holder of the head positioning a sample container below a liquid dispenser for dispensing a cleaning liquid into the sample container.
Figure 7:
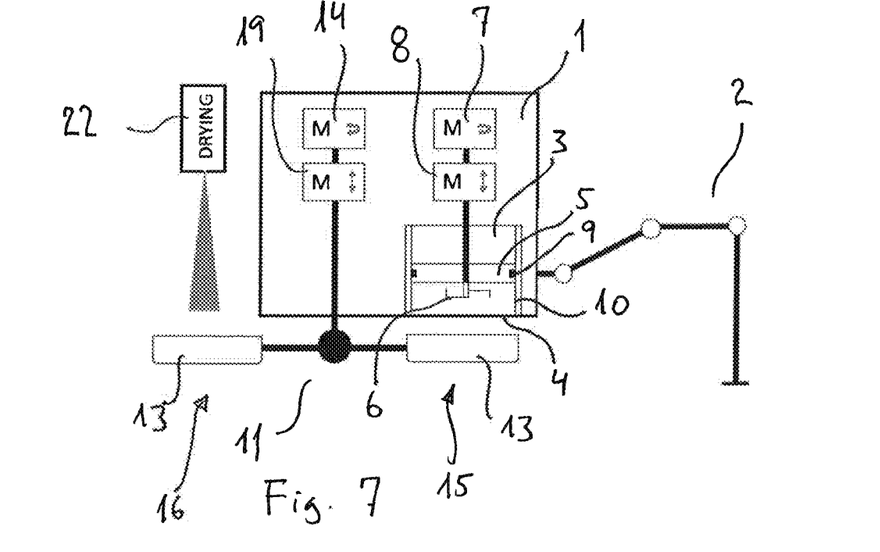
FIG. 7 shows the holder of the head positioning a sample container below a dryer providing a drying airflow to the sample container.

The emptied sample container 13 may then be washed. Depending on the type of matter that is sampled, the washing may take place after each sampling or at regular intervals, such as after five or ten samples. The washing procedure starts by moving, by means of the arm 2, the head 1 with the sample container 13 to be washed to a position as shown in FIG. 6, where the sample container 13 is below a liquid dispenser 21 where a cleaning liquid is dispensed into the sample container 13. The liquid may e.g. be softened water or water admixed with a detergent. The holder 11 is subsequently rotated by means of the first driving means 14 so that the sample container 13 is in the first position 15, where after the holder 11 is moved by means of the holder displacement means 19 so that the sample container 13 is in tight contact with the head 1. The piston 5 and the rotor 6 are situated in the most extended position near the opening 4 of the inner chamber 3, so that the rotor 6 extends into the sample container 13 and into the liquid therein. By rotating the rotor 6 by means of the rotor drive means 7, the inner side of the sample container 13 is washed thoroughly. The head 1 is after the washing moved to the disposal location (not shown), the holder is rotated so that the sample container 13 is in the second position 16, and the position of the head 1 and thereby also of the sample container 13 held by the holder 11 is alternated so the opening 4 is oriented downwards and the liquid in the sample container 13 is disposed of. The position of the head 1 is alternated again and the head 1 is moved by means of the arm 2 to a position as shown in FIG. 7, where the sample container 13 held by the holder 11 in the second position 16 beneath a dryer 22 arranged for providing a drying airflow towards the inner portion of the sample container 13. Hereafter, the sample container 13 is cleaned and the device is ready for obtaining and analysing a new sample. The device may furthermore be provided with vision inspection means (not shown) arranged for inspecting the cleaned sample containers 13 to ensure that the quality of the cleansing is satisfactory.

The wall 10 of the inner chamber 3 together with the rotor 6 and the piston 5 may also require a cleansing, which may be achieved in a similar manner. The washing procedure starts by moving, by means of the arm 2, the head 1 with the sample container 13 to a position as shown in FIG. 6, where the sample container 13 is below a liquid dispenser 21 where a cleaning liquid is dispensed into the sample container 13. The liquid may e.g. be softened water or water admixed with a detergent. The holder 11 is subsequently rotated by means of the first driving means 14 so that the sample container 13 is in the first position 15, where after the holder 11 is moved by means of the holder displacement means 19 so that the sample container 13 is in tight contact with the head 1. The head 1 is then rotated by means of the arm 2 so that the opening 4 of the inner chamber 3 is oriented upwards. The piston 5 and the rotor 6 are situated in the most retracted position away from the opening 4 of the inner chamber 3 as shown in FIG. 8. By rotating the rotor 6 by means of the rotor drive means 7, the wall of the inner chamber 3, the rotor 6 itself and the piston 5 are washed thoroughly. The head 1 is after the washing moved to the disposal location (not shown), the head 1 is rotated by means of the arm 2 to a position where the opening 4 of the inner chamber 3 is oriented downwards so the liquid will collect in the sample container 13; the holder is rotated so that the sample container 13 is in the second position 16, and the position of the head 1 and thereby also of the sample container 13 held by the holder 11 is alternated so the opening 4 is oriented downwards and the liquid in the sample container 13 is disposed of. The position of the head 1 is alternated again and the head 1 is moved by means of the arm 2 to a position, where the opening 4 of the inner chamber 3 is beneath a dryer 22 arranged for providing a drying airflow towards the inner chamber 3. Hereafter, the inner chamber 3 with its contents is cleaned and the device is ready for obtaining and processing a new sample.

The device may comprise other parts and sensors for surveillance of the process and the sample, such as temperature sensors, and parts of the above-described process may be omitted, such as the hardness detection part, depending on the type of matter to be analysed and the information about the sampled matter that is desired to be obtained.

LIST OF REFERENCE NUMERALS

1 Head
2 Arm
3 Inner chamber
4 Opening of inner chamber
5 Piston
6 Rotor
7 Rotor drive means
8 Displacement means for piston and rotor
9 Edge part of piston
10 Wall of the inner chamber
11 Holder
12 Gripping pan of holder
13 Sample container
14 First driving means for rotating the holder
15 First position of sample container
16 Second position of sample container
17 Scale
18 Optical analysis system using Near Infrared (NIR) analysis
19 Holder displacement means
20 Surface scanner
21 Liquid dispenser
22 Dryer

The invention claimed is:

1. A device for handling a sample container having an open side, the device comprising:
   a head having an inner chamber with an opening arranged at one end, the inner chamber having a constant cross-sectional shape taken perpendicularly to a longitudinal axis of the inner chamber, wherein the opening extends perpendicularly to the longitudinal axis;
   a rotor part arranged within the inner chamber;
   a rotor drive arranged for rotating the rotor part around the longitudinal axis;
   a rotor displacer arranged to displace the rotor part along the longitudinal axis;
   a piston comprising an edge part of a cross-sectional shape corresponding to the cross-sectional shape of the inner chamber; and
   a piston displacer arranged to displace the piston along the longitudinal axis so that the edge part of the piston will scrape a wall of the inner chamber;
   the device further comprising:
   a holder arranged for supporting a sample container so that an open side of the sample container is in tight connection with the opening of the inner chamber; and
   a head drive arranged for alternating an orientation of the head between a position where the opening of the inner chamber is oriented upwards and a position where the opening of the inner chamber is oriented downwards.

2. The device according to claim 1, wherein the rotor comprises a grinder so that the rotor when rotated by the rotor drive is suitable for grinding a sample situated in the inner chamber.

3. The device according to claim 1, wherein the edge part of the piston is made from an elastomer.

4. The device according to claim 1, further comprising a control arranged to control operation of at least the rotor drive, the rotor displacer, the piston displacer, and the head drive.

5. The device according to claim 1, wherein the piston and the rotor part are arranged to be displaced simultaneously, and the piston displacer also constitutes the rotor displacer.

6. The device according to claim 1, wherein the holder is movable with respect to the head to retrieve the sample container, when containing a sample, and placing the sample container at a first position so that the open side of the sample container is in tight connection with the opening of the inner chamber and to remove the sample container from the first position and place it at a second position.

7. The device according to claim 6, wherein the holder is arranged for supporting a second sample container simultaneously with the sample container and move both the sample container and the second container simultaneously to exchange their mutual positions with respect to the opening of the inner chamber.

8. The device according to claim 6, wherein the holder is arranged on the head of the device and comprises a holder drive that drives a movement of the holder.

9. The device according to claim 6, wherein operation of the holder is controlled by a control.

10. The device according to claim 1, further comprising a liquid disperser arranged for dispensing a cleansing liquid into the sample container held by the holder.

11. The device according claim 1, further comprising a dryer arranged for providing a drying airflow towards the sample container held by the holder.

12. The device according to claim 1 further comprising a suction device arranged for emptying of the sample container held by the holder.

13. The device according to claim 1, further comprising a scanner arranged for scanning an upper surface of a sample situated in the sample container held by the holder.

14. The device according to claim 1, further comprising an optical analysis system arranged for scanning the content of the sample container through a transparent bottom part of the sample container, and wherein the holder is arranged to position the sample container for being scanned by the optical analysis system.

15. The device according to claim 4, wherein the control of the device comprises a data communication interface suitable for connection with a data communication interface of an optical analysis system, and wherein the control of the device is adapted for transferring data identifying content of the sample container to a control of the optical analysis system prior to scanning of the content of the sample container.

16. The device according to claim 4, wherein the control is arranged to control operation of the device in a sequence where the head is in a position, where the opening of the inner chamber is oriented upwards, in which position the rotor drive is operated to rotate the rotor part for a period of time, followed by an alternation of the orientation of the head and the holder to a position, where the opening of the inner chamber is oriented downwards, where the rotor displacer and the piston displacer are operated to move the rotor part and the piston to a position near the opening of the inner chamber, and the holder removing the sample container from a position in which the tight connection with the opening of the inner chamber is present.

17. The device according to claim 16, wherein the control is arranged to control operation of the device in a sequence where the head initially is in a position, where the opening of the inner chamber is oriented downwards, and the holder are operated to place a sample container so that the open side of the sample container is in tight connection with the opening of the inner chamber, where after the head drive is operated to alternate the orientation of the head and the holder to a position where the opening of the inner chamber is oriented upwards.

18. The device according to claim 1, wherein the rotor comprises one or more blades each having a grinding edge and a blunt spine, and the device further comprises a control arranged to control operation of the rotor to rotate in a first direction, where each grinding edge of the one or more blades is moved forward, followed by a reverse rotation, wherein each blunt spine of the one or more blades is moved forward.

19. The device according to claim 11, wherein a control is arranged to control the operation of the device in a sequence where the head is at a position, where the opening of the inner chamber is oriented downwards and the sample container is held by the holder in a position, where the open side of the sample container is accessible, where the head is moved to a position beneath a liquid dispenser, which is operated to dispense a cleansing liquid into the sample container, where after the holder is moved to place the open side of the sample container in the tight connection with the opening of the inner chamber and the rotor part and the piston is displaced by the rotor displacer and the piston displacer, so that the rotor part extends into the sample container and the rotor part is rotated by the rotor drive, followed by moving the holder to remove the sample container from the tight connection with the opening of the inner chamber, emptying of the sample container and moving the head to a position with respect to the dryer, where the dryer is operated to provide a drying airflow into the sample container.

20. The device according to claim 1, comprising a robotic arm to which the head is connected and which serves as head drive.

21. The device according to claim 1, further comprising:
a carousel for holding the sample container and a second sample container; and
a carousel drive that drives a rotation of the carousel and wherein the device is adapted for retrieving the sample container and the second container from the carousel by the holder, and wherein operation of the carousel drive is controlled by a control of the device.

22. A system comprising:
a device comprising:
   a head having an inner chamber with an opening arranged at one end, the inner chamber having a constant cross-sectional shape taken perpendicularly to a longitudinal axis of the inner chamber, wherein the opening extends perpendicularly to the longitudinal axis;
   a rotor part arranged within the inner chamber;
   a rotor drive arranged for rotating the rotor part around the longitudinal axis;
   a rotor displacer arranged to displace the rotor part along the longitudinal axis;
   a piston comprising an edge part of a cross-sectional shape corresponding to the cross-sectional shape of the inner chamber; and
   a piston displacer arranged to displace the piston along the longitudinal axis so that the edge part of the piston will scrape a wall of the inner chamber;
the device further comprising:
   a holder arranged for supporting a sample container so that an open side of the sample container is in tight connection with the opening of the inner chamber; and
   a head drive arranged for alternating an orientation of the head between a position where the opening of the inner chamber is oriented upwards and a position where the opening of the inner chamber is oriented downwards; and
an arrangement for inline optical analysis of a flow of matter by an optical analysis system of the arrangement, wherein a control of the arrangement is adapted for receiving data from a scanning of matter from the optical analysis system of the arrangement—and calibrating the optical analysis system of the arrangement based thereon.

23. A method of use of a device comprising:
a head having an inner chamber with an opening arranged at one end, the inner chamber having a constant cross-sectional shape taken perpendicularly to a longitudinal axis of the inner chamber, wherein the opening extends perpendicularly to the longitudinal axis;
a rotor part arranged within the inner chamber;
a rotor drive arranged for rotating the rotor part around the longitudinal axis;
a rotor displacer arranged to displace the rotor part along the longitudinal axis;
a piston comprising an edge part of a cross-sectional shape corresponding to the cross-sectional shape of the inner chamber; and
a piston displacer arranged to displace the piston along the longitudinal axis so that the edge part of the piston will scrape a wall of the inner chamber;
a holder arranged for supporting a sample container so that an open side of the sample container is in tight connection with the opening of the inner chamber; and
a head drive arranged for alternating an orientation of the head between a position where the opening of the inner chamber is oriented upwards and a position where the opening of the inner chamber is oriented downwards;
the method of use of the device comprising:
grinding of a sample; and
presenting the sample for an analysis system.

24. The method of use of a device according to claim 23, wherein the analysis system comprises an optical analysis system.

* * * * *